United States Patent [19]
Dilgard et al.

[11] Patent Number: 5,506,465
[45] Date of Patent: Apr. 9, 1996

[54] UNIVERSAL RECTANGULAR BASE BULB ADAPTER FOR PROVIDING EXTERNAL ELECTRICAL CONNECTION BETWEEN POWERED VEHICLES AND TRAILERS

[75] Inventors: Michael H. Dilgard, Tempe; Richard J. Herrera, Chandler, both of Ariz.

[73] Assignee: U-Haul International, Inc., Tempe, Ariz.

[21] Appl. No.: 320,069

[22] Filed: Oct. 7, 1994

[51] Int. Cl.⁶ ........................................ H01J 5/48
[52] U.S. Cl. .................. 313/318.01; 439/503; 439/35
[58] Field of Search .................. 313/318.01, 318.11; 439/34, 35, 36, 623, 503

[56] References Cited

U.S. PATENT DOCUMENTS

| | | | |
|---|---|---|---|
| 3,137,448 | 6/1964 | Holzhause | 240/8.3 |
| 3,335,389 | 8/1967 | Reichardt | 339/28 |
| 3,344,265 | 9/1967 | Dillabough, Jr. | 313/318.11 |
| 3,400,293 | 9/1968 | Reichardt | 313/318 |
| 4,151,439 | 4/1979 | Moss | 313/318.01 |
| 4,772,209 | 9/1988 | Muncey | 439/36 |
| 5,008,588 | 4/1991 | Nakahara | 313/318.1 |

Primary Examiner—Donald J. Yusko
Assistant Examiner—Michael Day
Attorney, Agent, or Firm—Jeffer, Mangels, Butler & Marmaro

[57] ABSTRACT

An improved adapter bulb is provided for inserting within a rectangular base tail light socket of a powered vehicle for providing external electrical connection to a trailer lighting system. The adapter bulb includes a base member adapted to be disposed within a rectangular base tail light socket. The base member terminates in a rectangular contact portion having four electrical leads disposed substantially at each corner thereof thereby forming two pairs of substantially diagonally opposed electrical leads. A bulb is secured within the base member, and includes two filaments. Each filament is connected to one pair of the two pairs of substantially diagonally opposed electrical leads, that is, in a criss-cross relationship. Four wire leads are respectively joined, at one end, to one of the electrical leads, and at the other end to a diode. Two connectors for communicating with the trailer lighting system are each respectively joined to two of the four diodes, thereby defining two pairs of wire leads. Each pair of wire leads is connected to the same pair of electrical leads as one of said filaments. In another aspect of the invention, the four wire leads each connected to one of the electrical leads have, at their respective second ends, a connector for communicating with the trailer lighting system.

11 Claims, 6 Drawing Sheets

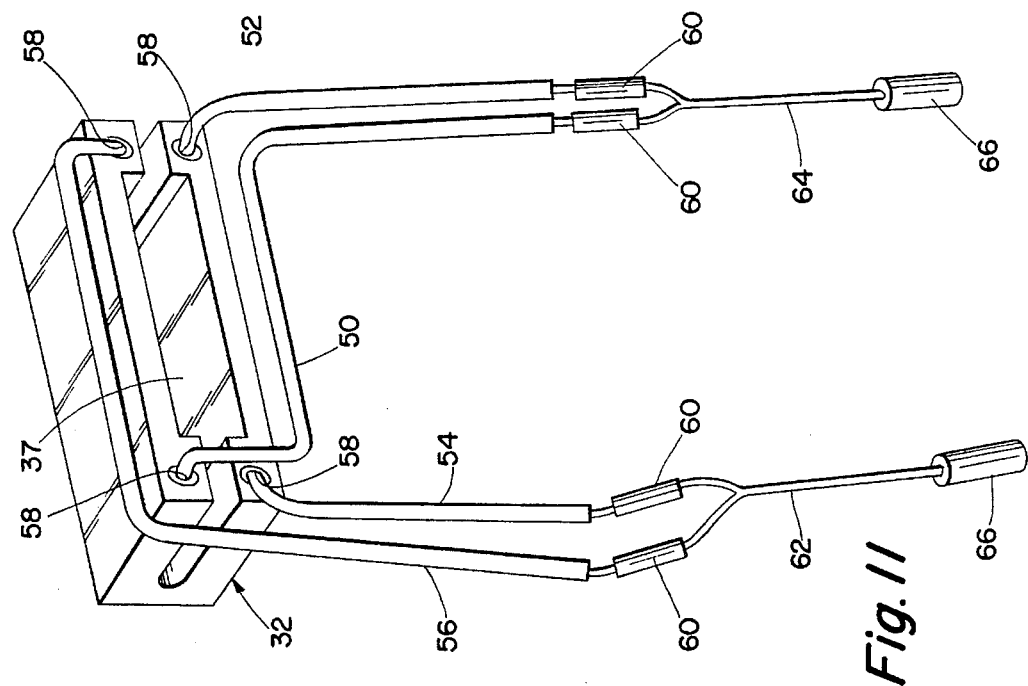
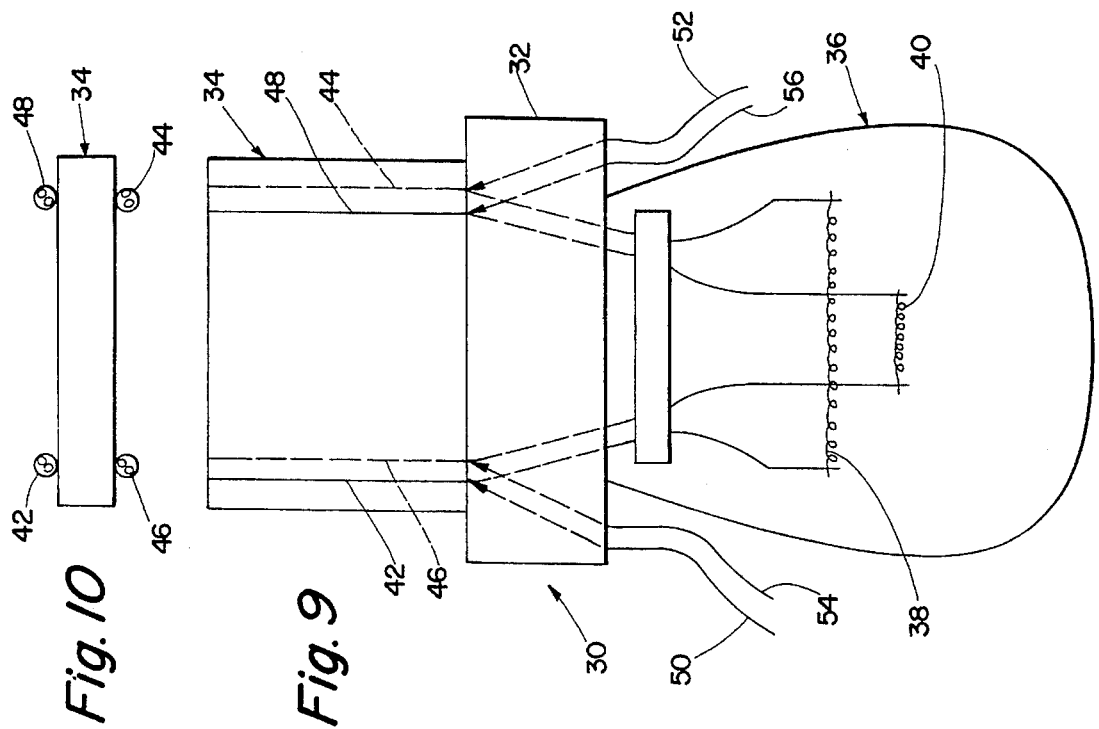

UNIVERSAL RECTANGULAR BASE BULB ADAPTER FOR PROVIDING EXTERNAL ELECTRICAL CONNECTION BETWEEN POWERED VEHICLES AND TRAILERS

FIELD OF THE INVENTION

The present invention relates to an improved adapter bulb useful for the connection of trailer lights to tow vehicles. More specifically, the invention relates to an adapter bulb which can be used with different types of square-base taillight bulb sockets.

BACKGROUND OF THE INVENTION

On-road trailers must be equipped with working turn signal, stop and running lights. Early efforts to so equip trailers required accessing the electrical wire harness of the towing vehicle, a laborious and time-consuming task. In order to eliminate the need for connecting the electrical system of a trailer directly to the towing vehicle wire harness, adapter bulbs were developed which could be connected directly to the tail light sockets of the vehicles. The adapter bulbs include wire, or "pigtail," leads for connection to the trailer, which receive power when the adapter bulbs are disposed in the tail light sockets. Such adapter bulbs are disclosed, for example, in U.S. Pat. Nos. 3,137,448; 3,335,389; 3,400,293; and 4,772,209.

Known adapter bulbs have included round bulb bases, since round-base tail light bulbs were long the standard. In recent years, rectangular, or "square" base tail light bulbs have become popular. Typically, rectangular tail light bulbs have two filaments. Sockets for rectangular base tail light bulbs thus have four contact points, two negative and two positive, disposed substantially at each corner of the socket. The four contact points thus form two pairs of substantially diagonally opposed contact points.

The modern rectangular bulb bases present a challenge, however, due to the variability of the arrangement within the socket of the positive and negative connections for the bulb filaments. In one common arrangement, shown in FIG. 1, an "end ground" socket 10 has two positive contact points 12 on one end of socket 10, and two negative contact points 14 at the opposite end of socket 10. In a second arrangement, shown in FIG. 2, a "side ground" socket 16 has positive contact points 12 on one side of socket 16, and the negative contact points 14 on the other side of socket 16.

A known rectangular base bulb 18 for use with either of sockets 10 or 16 typically has first and second filaments 20 and 22, respectively, which are placed in contact (by means of leads, not shown) with the two positive contact points 12 and the two negative contact points 14 in a diagonal or criss-cross manner (see FIG. 3), although the filaments are not necessarily in a criss-cross relationship within the bulb itself. Such rectangular base bulbs 18 will light regardless of the type of socket into which they are inserted. As shown in FIGS. 4a–b, filaments 20 and 22 are each in contact with a positive contact point 12 of the socket into which the bulb is inserted, whether that socket is an "end ground" as shown in FIG. 4a, or a "side ground" as shown in FIG. 4b.

For an adapter bulb to properly function, however, the filament ends that are used for wire lead attachment must contact the positive connections in the rectangular bulb socket. Thus, up to now, adapter bulbs for rectangular bulb sockets have come in two different configurations with two wire lead connection points, each useful with one type of rectangular bulb socket. In addition, adapter bulbs must be oriented correctly within the correct socket type. In FIG. 5, an "end ground" adapter bulb 24 has wire lead connection points 26 on one end as shown. In FIG. 6, a "side ground" adapter bulb 28 has wire lead connection points 26 on one side as shown.

Determining which adapter bulb is suitable for any given rectangular bulb socket, and whether or not the adapter bulb is correctly oriented with respect to the socket, is often difficult. FIGS. 7a–d and 8a–d illustrate the possible configurations of "end ground" and "side ground" rectangular base adapter bulb assemblies, respectively, within rectangular base sockets. The configurations are: (a) Correct bulb, correct socket orientation; (b) correct bulb, incorrect socket orientation; (c) incorrect bulb, orientation 1; and (d) incorrect bulb, orientation 2.

In FIG. 7a, "end ground" adapter bulb 24 is correctly oriented in "end ground" socket 10. Both wire lead connection points 26 are in contact with positive contact points 12, and thus both wire leads (not shown) are working leads. In FIG. 7b, adapter bulb 24 is inserted incorrectly oriented in socket 10. As a result, neither wire lead connection point 26 contacts a positive contact point 12 in socket 10, and so neither wire lead is a working lead. In FIG. 7c, "end ground" adapter bulb 24 is inserted in "side ground" socket 16, with the result that only one wire lead is a working lead. In FIG. 7d, adapter bulb 24 is inserted in socket 16 in reversed orientation. Again, only one wire lead is a working lead. Analogous configurations are shown in FIGS. 8a–d for "side ground" adapter bulb 28.

Thus, only the two configurations in which the adapter bulb is correctly oriented in the correct socket result in a completely functional trailer connection.

A need has existed for a rectangular base adapter bulb that provides wire lead connection points which contact both positive connections within the bulb socket regardless of the arrangement of connections within the bulb socket or the orientation of the adapter bulb with respect to the bulb socket.

SUMMARY OF THE PREFERRED EMBODIMENTS

In accordance with one aspect of the present invention, there has been provided an improved adapter bulb for inserting within a rectangular tail light socket of a powered vehicle for providing external electrical connection to a trailer lighting system. The adapter bulb includes a base member adapted to be disposed within a rectangular tail light socket. The base member terminates in a rectangular contact portion having four electrical leads disposed substantially at each corner thereof thereby forming two pairs of substantially diagonally opposed electrical leads. A bulb is secured within the base member, and includes two filaments. Each filament is connected to one pair of the two pairs of substantially diagonally opposed electrical leads, that is, in a criss-cross relationship. Four wire leads are respectively joined, at one end, to one of the electrical leads, and at the other end to a diode. Two connectors for communicating with the trailer lighting system are in turn respectively joined to two of the four diodes, thereby defining two pairs of wire leads. Each pair of wire leads is connected to the same pair of electrical leads as one of said filaments. Put another way, each pair of wire leads is connected to one of the substantially diagonally opposed pair of electrical leads of the contact portion of the base member such that each wire lead of the pair of wire leads is respectively connected to one electrical lead of the pair of electrical leads.

In another aspect of the invention, the four wire leads each connected to one of the electrical leads are not further connected to diodes and subsequently grouped into pairs for joining with the trailer lighting system connectors. Rather, each of the four wire leads has, at its respective second end, a connector for communicating with the trailer lighting system.

The present invention thus provides a universal rectangular base adapter bulb which assures ultimate contact of both of the connectors to the trailer lighting system with positive contact points within the rectangular socket, regardless of the type of socket or the orientation of the adapter bulb with respect thereto. Moreover, the inventive adapter bulb avoids the danger of shorting the electrical systems of the vehicles and trailers. In the first embodiment, this is achieved by virtue of the diodes, which block the flow of current back to the bulb adapter through the leads which are not in contact with the positive contact points of the socket. In the second embodiment, this is achieved by determining which two of the four pigtail leads are the working leads, and then simply cutting off the non-working pigtail leads.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIGS. 1–8d depict the prior art, wherein FIG. 1 is a schematic representation of an "end ground" type of square bulb socket, showing the positive contact points on one end of the socket;

FIG. 2 is a schematic representation of a "side ground" type of square bulb socket, showing the positive contact points on one side of the socket;

FIG. 3 is a schematic representation of a square bulb, illustrating crossed filaments therein;

FIG. 5 is a schematic representation of an adapter bulb for use with "end ground" sockets;

FIG. 6 is a schematic representation of an adapter bulb for use with "side ground" sockets;

FIGS. 8a–d illustrate a "side ground" adapter bulb inserted correctly oriented and incorrectly oriented in "side ground" socket, and both orientations in an "end ground" socket;

FIG. 9 is a top schematic view of a portion of an adapter bulb according to the invention, showing the connections between the bulb filaments, the electrical leads which contact the socket contact points, and the wire leads;

FIG. 10 is an end view of an end contacting member of the base member of the embodiment shown in FIG. 9;

FIG. 11 is a perspective view of a first embodiment of an adapter bulb according to the invention, with the bulb omitted for clarity, showing the disposition of the wire leads, diodes, and connectors;

DETAILED DESCRIPTION OF THE PREFERRED EMBODIMENTS

Figure 1:
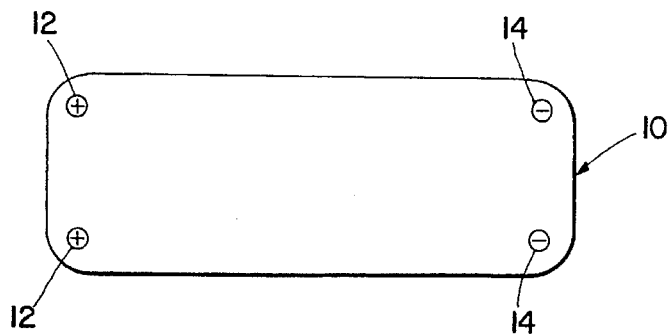
Figure 2:
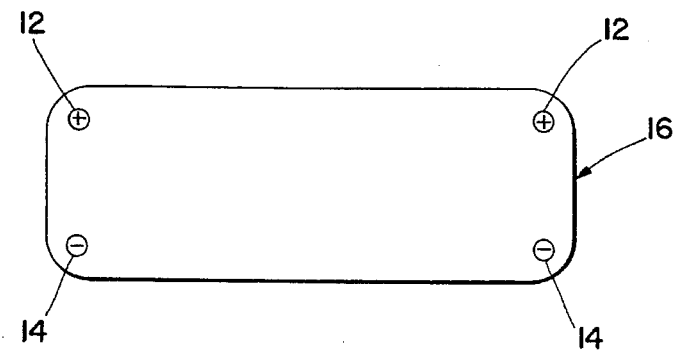
Figure 3:
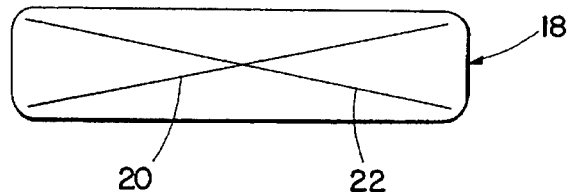
Figure 4A:
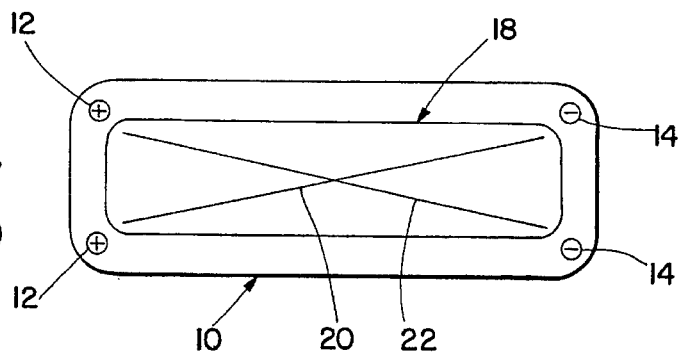
FIGS. 4a–b are schematic depictions of a square bulb disposed within an "end ground" and "side ground" socket, respectively.
Figure 4B:
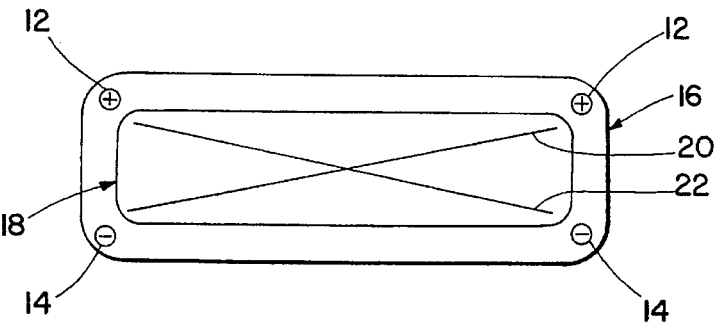
Figure 5:
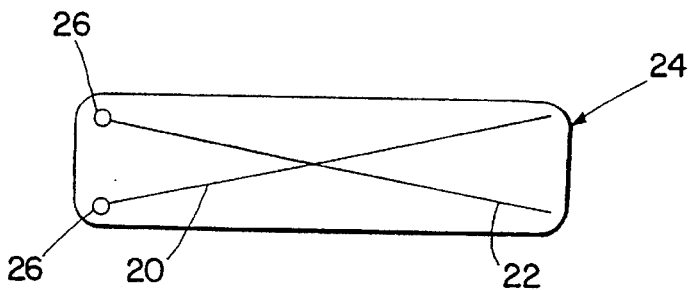
Figure 6:
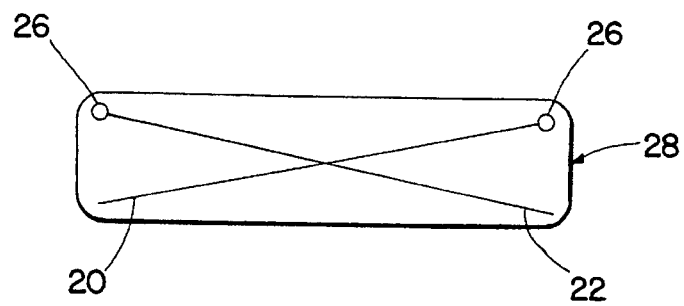
Figure 7A:
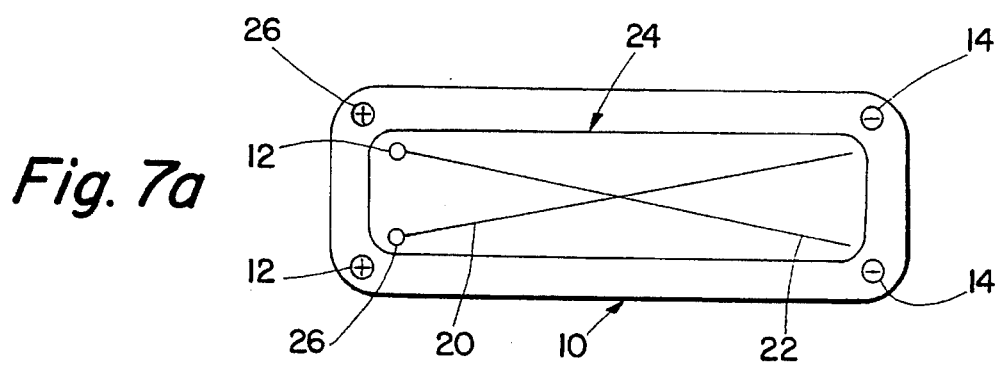
FIGS. 7a–d illustrate an "end ground" adapter bulb inserted correctly oriented and incorrectly oriented in an "end ground" socket, and both orientations in a "side-ground" socket.
Figure 7B:
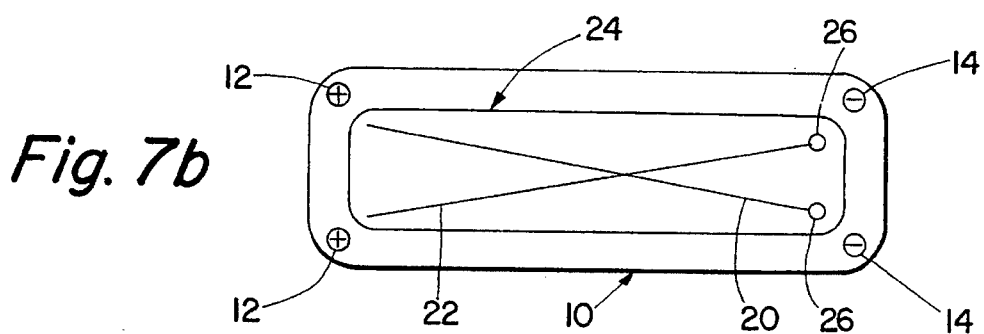
Figure 7C:
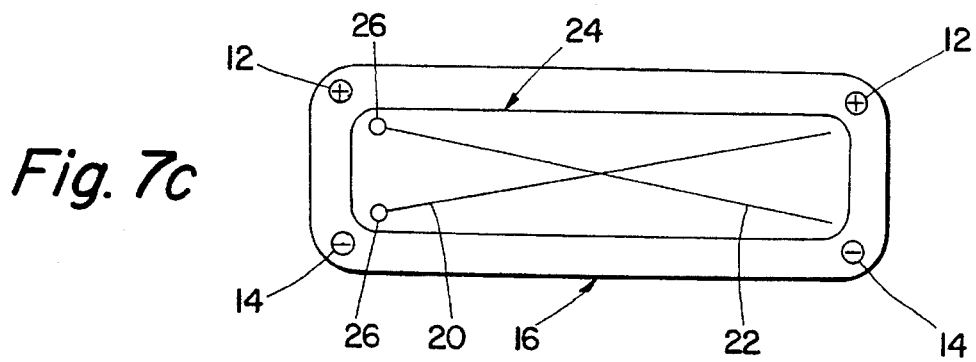
Figure 7D:
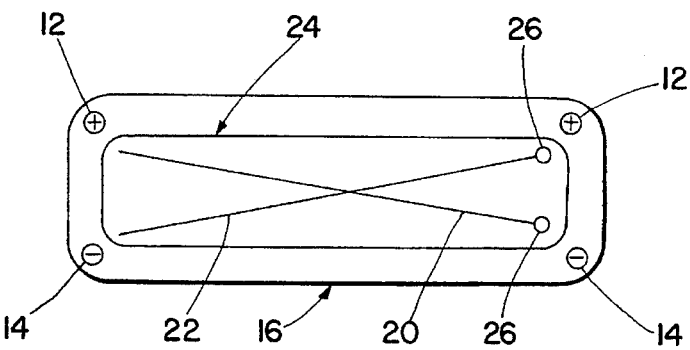
Figure 8A:
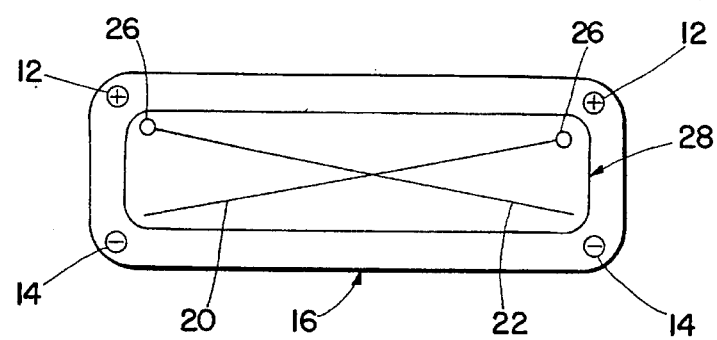
Figure 8B:
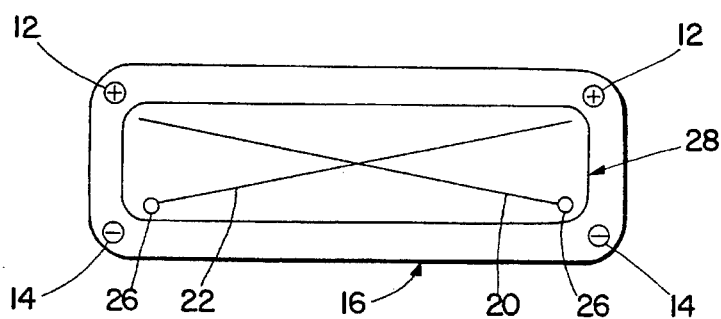
Figure 8C:
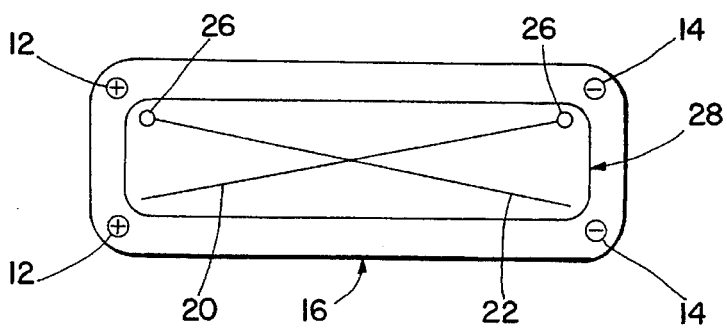
Figure 8D:
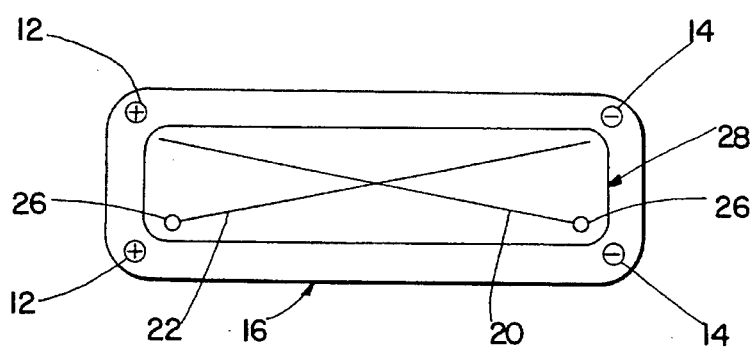

Referring now to the drawings, the arrangement of leads and electrical connections according to the invention is illustrated in FIG. 9. Adapter 30 includes base member 32 having rectangular contact portion 34 and bulb 36 inserted in opening 37 (see FIG. 11) and having first filament 38 and second filament 40. Four electrical leads 42, 44, 46 and 48 extend along rectangular contact portion 34 (see FIG. 10) to make contact with the four contacts within the rectangular base socket of the towing vehicle, which can be of the "end ground" or "side ground" types previously discussed (see FIGS. I and 2, sockets 10 and 16). Two electrical leads, leads 42 and 48, extend along one side ("T") of rectangular contact portion 34, while remaining electrical leads 44 and 46 extend along the opposite side ("B"). Filaments 38 and 40 are connected to electrical leads 42, 44, 46 and 48 in a "criss-cross" manner such that filament 38 is connected to leads 42 and 44, while filament 40 is connected to leads 46 and 48. Note that filaments 38 and 40 can be parallel to each other (the illustrated case in FIG. 9) and need not physically cross each other within bulb 36. Any configuration that provides a similar relationship between the filaments and the contact points within the rectangular base sockets as described is acceptable.

Wire leads 50, 52, 54 and 56 are also connected to electrical leads 42, 44, 46 and 48. As shown in FIG. 9, two wire leads are mounted in base member 32 on either side of bulb 36, with wire leads 50 and 54, on one side, being connected to electrical leads 42 and 46, respectively, while wire leads 52 and 56, on the other side, are connected to electrical leads 44 and 48, respectively. Thus, wire leads 50 and 52 are in contact with filament 38, while wire leads 54 and 56 are in contact with filament 40.

Preferably, base member 32 has defined therein a plurality of openings 58 (see FIG. 11 ) through which the wire leads 50, 52, 54 and 56 extend. Preferably, at least one such opening 58 is defined in base member 32 on each side of bulb 36. If desired, each wire lead 50 can be provided with its own opening 58 through base member 32.

Figure 12A:
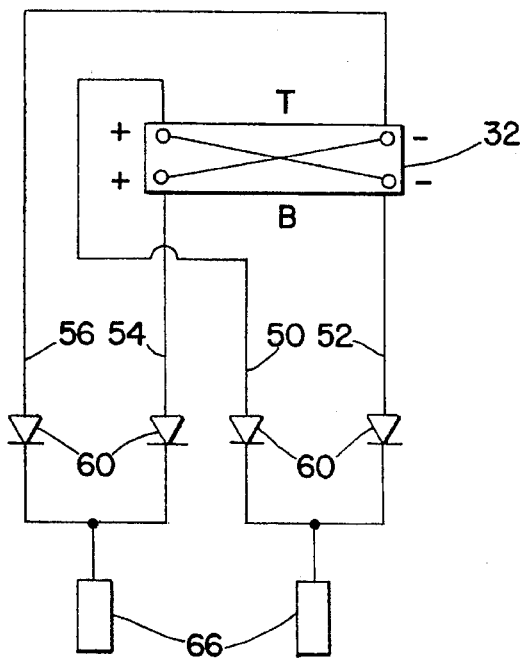
FIG. 12a–d are schematic diagrams showing the working leads (in bold) which correspond to the combinations of socket configuration and bulb orientation described in FIGS. 7a–d.
Figure 12B:
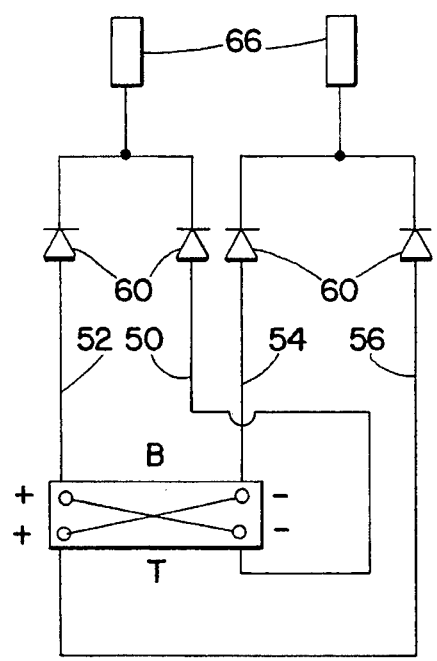
Figure 12C:
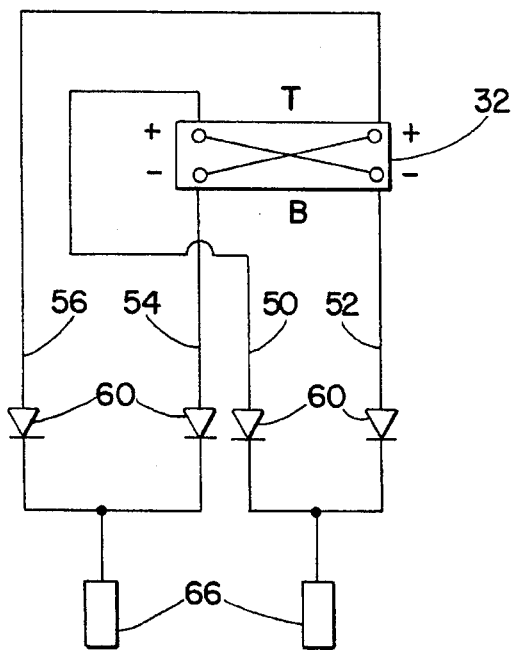
Figure 12D:
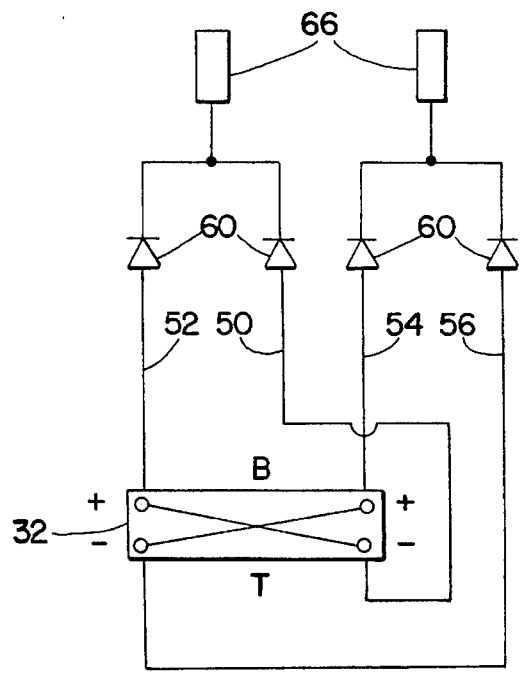

A first embodiment of an adapter of the invention is illustrated in FIG. 11. Wire leads 50 and 52 are arranged to one side of base member 32 (for example, by taping or winding together). Likewise, wire leads 54 and 56 are arranged to the opposite side of base member 32. Each of wire leads 50, 52, 54 and 56 are connected (for example, by soldering) to a diode 60 at one end thereof. The other ends of diodes 60 are connected together as shown, so that wire leads 50 and 52, and likewise wire leads 54 and 56, are connected together through their respective diodes 60, to form common leads 62 and 64. Current flow through diodes 60 is in the direction from the base member 32. Common leads 62 and 64 terminate in connectors 66, which can be female or male connectors, for example, or any other desired type of connector. Connectors 66 engage with corresponding connectors of the electrical system of the trailer being towed (not shown). As shown schematically in FIGS. 12a–d, no matter what the arrangement of positive and negative contact points in the socket (end ground or side ground), and no matter what the orientation of the inventive adapter within the socket, both connectors 66 will always be in contact with a positive contact point, and thus two working leads will always be provided. Furthermore, diodes 60 will prevent short-circuiting.

Figure 13A:
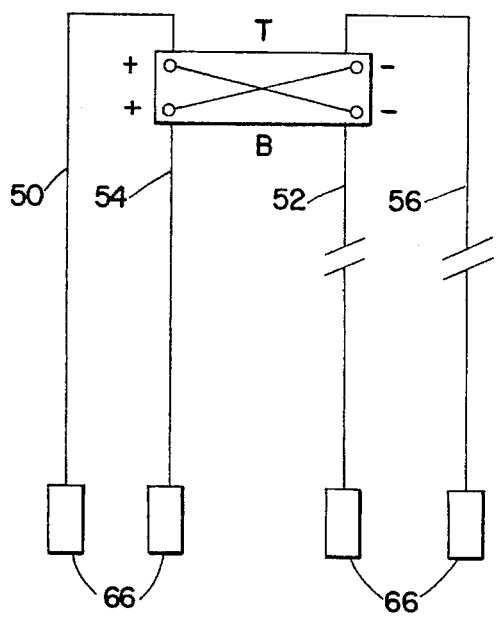
FIG. 13a–d are schematic diagrams showing the working leads (in bold) of a second embodiment of an adapter bulb according to the invention, in which diodes are omitted and non-working leads are cut or otherwise disabled, in the combinations described in FIGS. 7a–d.
Figure 13B:
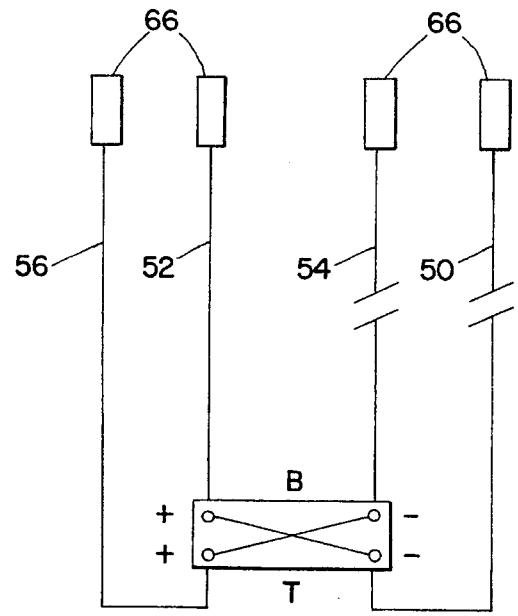
Figure 13C:
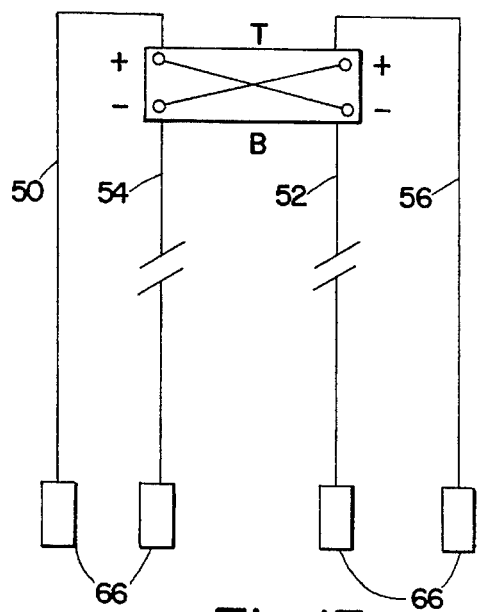
Figure 13D:
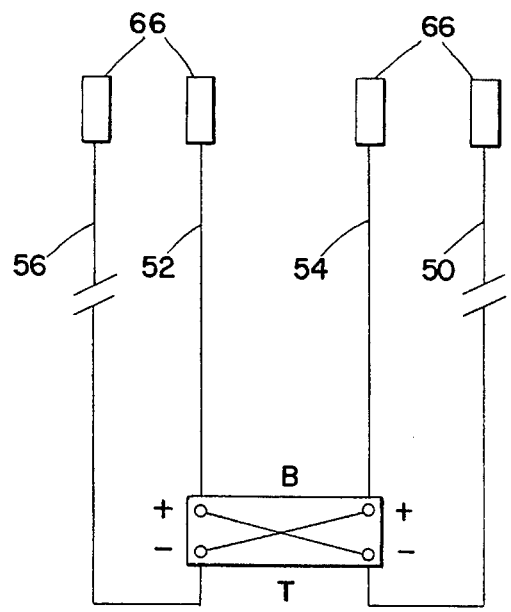

In an alternative embodiment illustrated schematically in FIGS. 13a–d, diodes 60 are omitted, and wire leads 50, 52, 54 and 56 are not paired but remain separate. Each wire lead is joined to a separate connector 66. As with the previous embodiment, two working leads are always provided regardless of the type of socket and the orientation of the adapter within it. It is then a simple matter to determine which two wire leads are the working leads. The remaining non-working wire leads can then be cut off or otherwise disabled.

What is claimed is:

1. An adapter bulb for inserting within a rectangular base tail light socket of a powered vehicle for providing external electrical connection to a trailer lighting system comprising:
   a) a base member adapted to be disposed within a rectangular base tail light socket, said base member terminating in a contact portion having four electrical leads disposed substantially at each corner thereof thereby forming two pairs of substantially diagonally opposed electrical leads;
   b) a bulb secured within said base member, said bulb comprising two filaments disposed therewithin, each said filament having first and second ends, wherein each said filament is connected at said first and second ends to one pair of said two pairs of substantially diagonally opposed electrical leads;
   c) four diodes;
   d) four wire leads having first and second ends, each of said first ends of said wire leads being connected to one of said electrical leads, each of said second ends of said wire leads being connected to one of said diodes; and
   e) two connectors for communicating with said trailer lighting system, each of said connectors being joined to two of said four diodes thereby defining two pairs of said wire leads,
   wherein each said pair of wire leads is connected to the same pair of electrical leads as one of said filaments.

2. An adapter bulb as claimed in claim 1, wherein said base member has defined therethrough a plurality of openings, and at least one of said leads extends through each of said plurality of openings.

3. An adapter bulb as claimed in claim 2, wherein at least one of said plurality of openings is defined through said base member on each side of said bulb.

4. An adapter bulb as claimed in claim 2 wherein said base member has defined therethrough four openings and each of said four leads extends through a different one of said openings.

5. An adapter bulb as claimed in claim 1 wherein each of said diodes is disposed between said base and said connector to which it is joined.

6. An adapter bulb for inserting within a rectangular-based tail light socket of a powered vehicle for providing external electrical connection to a trailer lighting system comprising:
   a) a base member adapted to be disposed within a rectangular base tail light socket, said base member terminating in a contact portion having four electrical leads disposed substantially at each corner thereof thereby forming two pairs of substantially diagonally opposed electrical leads;
   b) a bulb secured within said base member, said bulb comprising two filaments disposed therewithin, each said filament having first and second ends, wherein each said filament is connected at said first and second ends to one pair of said two pairs of substantially diagonally opposed electrical leads; and
   c) four wire leads having first and second ends, each of said first ends of said wire leads being connected to one of said electrical leads, each of said second ends of said wire leads being joined to a connector for communicating with said trailer lighting system.

7. An adapter bulb as claimed in claim 6, wherein said base member has defined therethrough a plurality of openings, and at least one of said wire leads extends through said each of said plurality of openings.

8. An adapter bulb as claimed in claim 7, wherein at least one of said plurality of openings is defined through said base member on each side of said bulb.

9. An adapter bulb as claimed in claim 7 wherein said base member has defined therethrough four openings and each of said four leads extends through a different one of said openings.

10. An adapter bulb base for inserting within a rectangular base tail light socket of a powered vehicle for providing external electrical connection to a trailer lighting system comprising:
    a) a base member adapted to be disposed within a rectangular base tail light socket, said base member terminating in a contact portion having four electrical leads disposed substantially at each corner thereof thereby forming two pairs of substantially diagonally opposed electrical leads;
    b) four diodes;
    c) four wire leads having first and second ends, each of said first ends of said wire leads being connected to one of said electrical leads, each of said second ends of said wire leads being connected to one of said diodes; and
    d) two connectors for communicating with said trailer lighting system, each of said connectors being joined to two of said four diodes thereby defining two pairs of said wire leads.

11. An adapter bulb base as claimed in claim 10, wherein said base member has defined therethrough a plurality of openings, and at least one of said leads extends through each of said plurality of openings.

* * * * *